M. F. YOUNT.
PUMP PISTON.
APPLICATION FILED SEPT. 15, 1920.
1,372,262.
Patented Mar. 22, 1921.
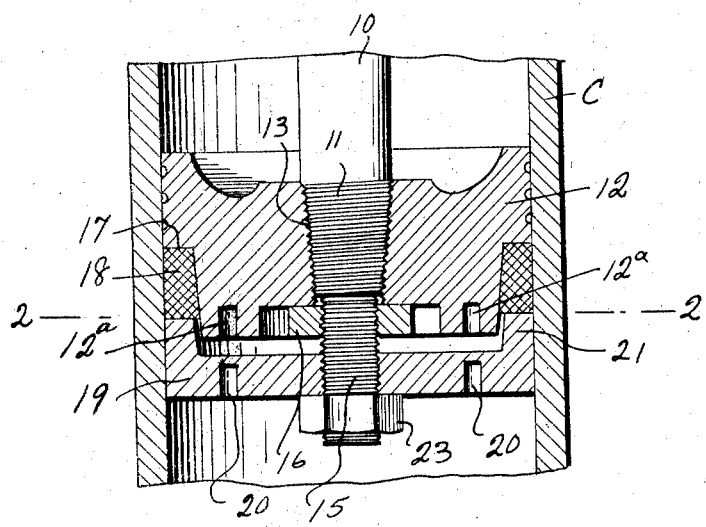
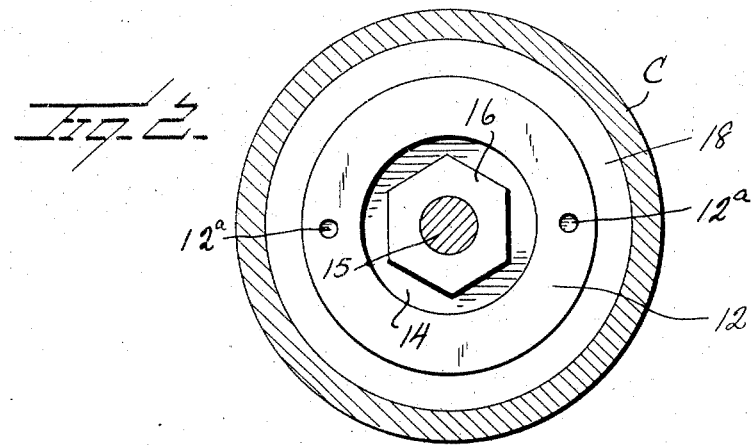
INVENTOR.
M. F. Yount
BY
Watson E. Coleman
ATTORNEY.

UNITED STATES PATENT OFFICE.

MILES F. YOUNT, OF SOURLAKE, TEXAS.

PUMP-PISTON.

1,372,262.

Specification of Letters Patent. Patented Mar. 22, 1921.

Application filed September 15, 1920. Serial No. 410,466.

*To all whom it may concern:*

Be it known that I, MILES F. YOUNT, a citizen of the United States, residing at Sourlake, in the county of Hardin and State of Texas, have invented certain new and useful Improvements in Pump-Pistons, of which the following is a specification, reference being had to the accompanying drawings.

This invention relates to pump pistons.

An important object of the invention is to provide a pump piston wherein the piston body proper is securely maintained against shifting upon the piston rod.

A further object of the invention is to provide in a pump piston, a piston body, the packing receiving groove of which is tapered from the following end of the piston forwardly, thereby permitting the use of unit packing.

A further object of the invention is to provide a device of the above character of a compact and simple nature in order to minimize the labor of repacking the pump.

Other objects and advantages of the invention will become apparent throughout the course of the following description.

In the drawings, wherein for the purpose of illustration is shown a preferred embodiment of my invention and wherein like reference characters designate like parts throughout, Figure 1 is a transverse sectional view taken through a pump piston constructed in accordance with my invention, and Fig. 2 is a section taken on the line 2—2 of Fig. 1.

Referring now more particularly to the drawings, the numeral 10 designates a piston rod provided adjacent its end with a tapered portion 11 which is externally screw threaded. A piston 12 is provided having an axial bore 13 which is tapered similarly to the taper of the piston rod, which is provided with internal screw threads coacting with the screw threads of the taper portion 11 of the piston rod. The piston body 12 may be brought into engagement with the piston rod by any suitable means, as, for example, by means of a key wrench engaging in sockets 12ª formed in the following end of the piston. The following end of the piston has formed therein a recess 14 and the portion of the piston rod 10 which extends into this recess and rearwardly from the following end of the piston is straight and screw threaded, as indicated at 15. Mounted upon this straight portion is a lock or jam nut 16 which abuts the end of the piston 12 within the recess 14 and which is of such thickness that it is completely concealed within the recess.

The piston body is reduced intermediate its ends as at 17, forming a shoulder and this reduction is increased rearwardly toward the following end of the piston, forming a tapered portion 18 affording between the walls of the cylinder C and the piston a tapered recess having its largest end disposed toward the following end of the piston. A follower plate 19 is provided having an axial screw threaded bore coacting with the straight portion 15 of the piston rod 10. The follower plate 19 is likewise provided with means whereby it may be rotated to cause it to shift longitudinally upon the rod by reason of its screw threaded engagement, as indicated at 20, preferably means of the same type and size as those employed in connection with the piston body 12, in order that a single wrench may suffice for both operations. This follower plate is provided upon the face thereof opposing the piston body 12 with an outstanding marginal flange 21 adapted to extend into the recess formed by the reduction of the piston.

It will be obvious that with the construction hereinbefore described a unit packing may be employed, or, in other words, a continuous ring packing slightly tapered to correspond to the taper of the recess formed in the piston for its reception. The follower plate or the shoulder 21 thereof will engage this packing and may be tightened to any desired extent by simply rotating the follower head. Means will, of course, be provided whereby the follower head may be locked in adjusted position, as, for example, a jam or lock nut 23, mounted upon the extreme outer end of the portion 15 of the rod 10 and abutting the plate.

It will be obvious that my device by reason of its simplicity of construction and the ease with which it may be maintained in operative condition is particularly well adapted for the use for which it was intended, and it will be likewise obvious that the construction as hereinbefore set forth is capable of some change without departing from the spirit of my invention. I accordingly do not limit myself to the construction as hereinbefore set forth except as so limited by the subjoined claims.

Having described my invention, what I claim is:

1. The combination with a piston rod provided adjacent its end with a tapered screw threaded portion of a piston provided with an axial tapered screw threaded bore receiving the tapered portion of the rod and engaging the screw threads thereof.

2. The combination with a piston rod provided adjacent its end with a tapered screw threaded portion of a piston provided with an axial tapered screw threaded bore receiving the tapered portion of the rod and engaging the screw threads thereof, said piston having an axial counter bore formed in the outer end thereof, and a jam nut having threaded engagement with the rod and engaging the piston within the counter bore.

3. The combination with a piston rod provided adjacent its end with a tapered screw threaded portion, of a piston provided with an axial tapered screw threaded bore receiving the tapered portion of the rod and engaging the screw threads thereof, said piston having an axial counter bore formed in the outer end thereof, the end of said rod being straight and provided with screw threads, said straight portion lying within the counter bore of said piston, a jam nut engaging the threads of said portion and abutting said piston within said counter bore, a follower plate having threaded engagement with the straight portion of said rod and abutting said piston, and a jam nut engaging said follower plate.

4. The combination with a piston rod provided adjacent its end with a tapered screw threaded portion, of a piston provided with an axial tapered screw threaded bore receiving the tapered portion of the rod and engaging the screw threads thereof, said piston having an axial counter bore formed in the outer end thereof, the end of said rod being straight and provided with screw threads, said straight portion lying within the counter bore of said piston, a jam nut engaging the threads of said portion and abutting said piston within said counter bore, a follower plate having threaded engagement with the straight portion of said rod and abutting said piston, and a jam nut engaging said follower plate, said piston being provided approximately centrally thereof with a reduction forming a shoulder, said reduction extending to and increasing toward the end of said piston abutted by said follower plate, and a marginal flange formed in said follower plate and overlying the reduced portion of the piston.

In testimony whereof I hereunto affix my signature.

MILES F. YOUNT.